Dec. 18, 1934.    A. S. DYSART ET AL    1,984,635
DYNAMOMETER
Filed Jan. 31, 1933

INVENTOR
Arthur S. Dysart, Charles E. Fraser,
and John Lind.
by Robert M. Barr
ATTORNEY Patented Dec. 18, 1934

1,984,635

UNITED STATES PATENT OFFICE 1,984,635

DYNAMOMETER

Arthur S. Dysart, Elizabeth, N. J., Charles E. Fraser, Rockville Center, and John Lind, Brooklyn, N. Y., assignors to Tinius Olsen Testing Machine Company, Philadelphia, Pa., a corporation of Pennsylvania Application January 31, 1933, Serial No. 654,388

3 Claims. (Cl. 265—24)

The present invention relates to dynamometers and more particularly to a heat generating mechanism for the measurement of power.

Some of the objects of the present invention are to provide an improved dynamometer; to provide means for accurately determining the work done by a power unit, such for example as a pneumatic hammer or other tool; to provide a dynamometer operating through the medium of heat generated as a function of the force applied by a power unit to determine and measure the work done by such unit; to provide means for measuring in terms of foot pounds and by the transformation of the energy developed into heat the work performed by a power unit, such as a pneumatic hammer; and to provide other improvements as will hereinafter appear.

Figure 1:
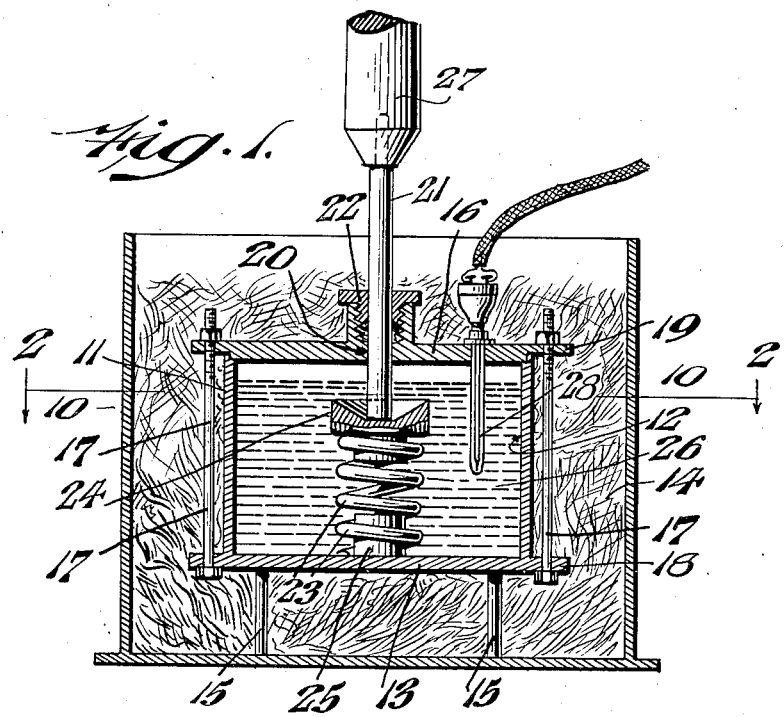
Figure 2:
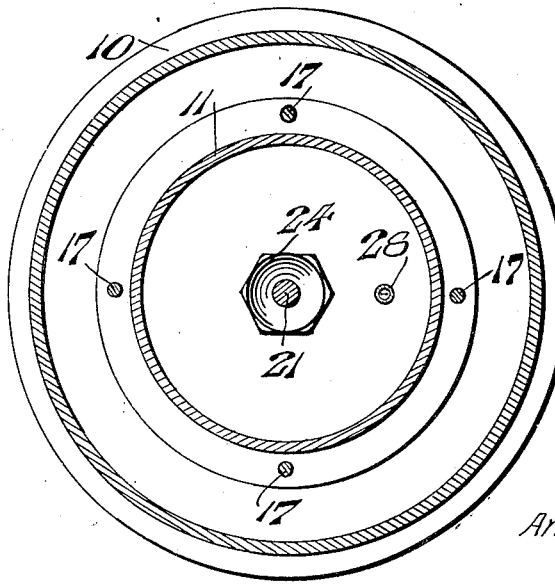
Figure 3:
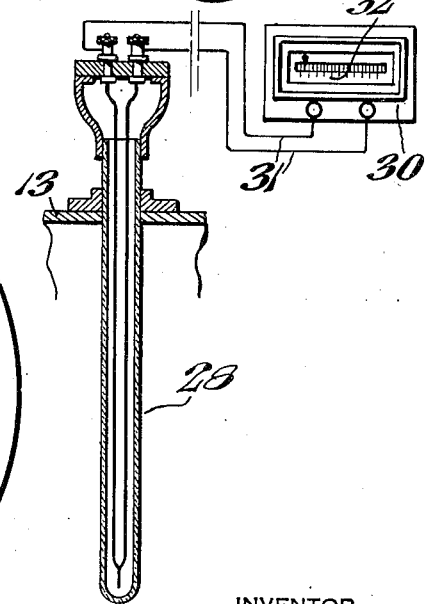

In the accompanying drawing Fig. 1 represents a sectional elevation of a dynamometer embodying one form of the present invention; Fig. 2 represents a section on line 2—2 of Fig. 1; and Fig. 3 represents a detail of the pyrometer assembly.

Referring to the drawing, one form of the present invention consists of a casing 10 which is preferably open at the top and within which a closed receptacle 11 is mounted with its side wall 12 and bottom 13 suitably spaced from the aforesaid casing 10. The space so provided is filled with suitable insulating material 14 in order to prevent radiation of any heat generated within the receptacle 11. Preferably the receptacle 11 is made of steel and in the shape of a cylinder which is supported by posts 15 in spaced relation to the casing 10. Thus in assembled condition the receptacle 11 is spaced from the casing 10 and is entirely surrounded by non-heat conducting material 14 in that the walls of the casing 10 extend above the receptacle 11 so that the top of the latter can also be covered.

The receptacle 11 has a removable cover 16 which is fastened thereon in leak proof relation by means of bolts 17 extending between flanges 18 and 19 formed respectively on the bottom 13 and cover 16. An opening 20 is provided in the cover 16 for the passage of an actuating rod here in the form of a pneumatic tool chisel blank 21 and a suitable stuffing box 22 protects the joint between the cover 16 and the chisel blank 21 from leakage as will be readily understood. The inner end of the chisel blank 21 enters the receptacle 11 coaxially with respect to a coiled steel spring 23 and seats upon a suitable follower in the form of a differential steel plunger 24, the stem part of which fits the inside of the spring while the head portion is the support for the free end of the blank or rod 21. The lower end of the spring 23 seats against the bottom 13 where it is prevented from lateral displacement by a fixed axis stud 25.

In the present embodiment of the invention the spring 23 is submerged in mercury 26 which nearly fills the receptacle 11, space being left to allow for the expansion of the mercury when heated as will be understood. Thus all moving parts capable of developing heat are submerged in the mercury 26 and it is this rise in temperature of the mercury which becomes a measure of the energy developed by the hammer or other power unit diagrammatically represented at 27 as resting upon the protruding end of the rod 21. This hammer 27 can be made to press down on the chisel blank or rod 21 with any desired pressure, and when the hammer is operated its movement is transmitted to the top of the plunger 24. By the action of the spring 23 the plunger 24 reciprocates up and down and the energy developed is converted into heat due to the friction between the oscillating parts and the mercury.

For determining the temperature of the mercury 26, a pyrometer consisting as usual of a thermo-couple 28, a galvanometer 30 and the necessary leads 31 is employed and the thermo-couple 28 is attached to the casing 10 with its end inserted well into the heat zone of the mercury 26. The galvanometer 30 is preferably arranged to indicate in degrees of heat upon its scale 32 the temperature corresponding to the current or millivoltage generated by the thermo-couple.

In the operation of the dynamometer all the energy is measured in the form of temperature rise of the mercury over a selected time interval, which in actual test has been taken as fifteen minutes. Thus the hammer or other power unit was operated continuously for the whole time period and the rise of temperature noted. The horse-power of the hammer can be calculated by taking into consideration the weight of the steel container, the weight of the mercury, the specific heat of mercury and of steel, plus the factor of temperature rise. Thus:—

Let WD=weight of steel container
Let WM=weight of mercury
Let specific heat Hg=.0333
Let specific heat steel=.1175
Let T°F=Temp. rise of Hg (thermocouple)
Then the Hg equiv. of the steel container=

$$\frac{.1175}{.0333} \times WD$$

And Wt. Hg+Equiv. Wt. Hg=T. W. (total Wt.)
And $$BTU = \frac{T.W. \times .0333 \times T° \times 778}{\text{Time in minutes}}$$

$$HP = \frac{T.W. \times .0333 \times T° \times 778}{33000 \times \text{Time in minutes}}$$

While in the foregoing mercury has been specifically described as the fluid used in the dynamometer, it is to be understood that this is only by way of example and that the invention is not limited to this specific fluid. In substituting other fluids serving the same end it will be understood that the above formula can be used though substituting, of course, for the specific heat of mercury the specific heat of the fluid used.

While only a single form is shown in which this invention may be embodied, it is to be understood that the invention is not limited to any specific construction, but might be applied to various forms without departing from the spirit of the invention or the scope of the appended claims.

Having thus described our invention, we claim:—

1. A dynamometer consisting of a receptacle having an opening for the passage of a reciprocable member, a heat conducting substance in said receptacle, an elastic member contacting with said substance and arranged to be distorted by the reciprocation of said reciprocable member, and means for measuring the variation of temperature of said substance caused by the distortion of said elastic member whereby the power applied to said reciprocable member can be determined.

2. A dynamometer consisting of a receptacle having an opening for the passage of a reciprocable member, a heat conducting substance in said receptacle, means for insulating said receptacle from atmospheric temperature, an elastic member contacting with said substance and arranged to be distorted by the reciprocation of said reciprocable member, and means for measuring the variation of temperature of said substance caused by the distortion of said elastic member whereby the power applied to said reciprocable member can be determined.

3. A dynamometer consisting of a receptacle having an opening for the passage of a reciprocable member, means for insulating said receptacle from atmospheric temperature, a heat conducting substance in said receptacle, a coil spring submerged in said substance and coaxially located with respect to said opening for distortion by the reciprocable member passing through said opening, and means for measuring the variation of temperature of said substance caused by the elastic action of said spring when energized by said reciprocable member.

ARTHUR S. DYSART.
CHAS. E. FRASER.
JOHN LIND.